United States Patent Office 3,536,708
Patented Oct. 27, 1970

3,536,708
NOVEL SUBSTITUTED S-TRIAZINES
Werner Heimberger, Hanau am Main, Germany, assignor to Deutsche Gold- und Silber-Scheideanstalt vormals Roessler, Frankfurt am Main, Germany
No Drawing. Continuation-in-part of application Ser. No. 623,548, Mar. 16, 1967. This application Dec. 18, 1967, Ser. No. 691,128
Claims priority, application Germany, Dec. 17, 1966, D 51,805
The portion of the term of the patent subsequent to Aug. 19, 1986, has been disclaimed
Int. Cl. C07d 87/40, 55/20
U.S. Cl. 260—247.2       11 Claims

ABSTRACT OF THE DISCLOSURE

Novel substituted triazines of the formula

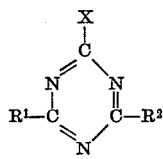

in which X represents —CCl$_3$, —CHCl$_2$ or —CH$_2$Cl, R$^1$ represents piperidino, morpholino, piperazino, N'-alkyl piperazino (alkyl=1–4 C atom alkyl), N'-alkanol piperazino (alkanol=1–4 C atom alkanol), N'-phenyl piperazino, N'-substituted phenyl piperazino in which the substituted phenyl group is phenyl substituted by one or more of the following: alkyl of 1–4 C atoms, —NO$_2$ or halogen atoms, preferably, chlorine, R$^2$ represents one of the groups specified for R$^1$ or

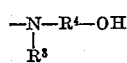

in which R$^3$ is lower alkyl with 1–6 C atoms or, preferably, hydrogen, and R$^4$ is a lower alkylene with 1–6 C atoms and their acid addition salts with pharmacologically acceptable organic and inorganic acids. Such compounds have valuable pharmaceutical properties, especially an antiphlogistic or anti-inflammatory action and an analgesic action.

CROSS-REFERENCE TO RELATED APPLICATION

This application is a continuation-in-part of application Ser. No. 623,548, filed Mar. 16, 1967, which in turn is a continuation-in-part of application Ser. No. 535,314, filed Mar. 18, 1966, now U.S. Pat. No. 3,462,430.

FIELD OF INVENTION

The present invention concerns novel 2,4,6 substituted s-triazines carrying a mono, di- or trichloromethyl substituent and a heterocyclic ring substituent selected from the group consisting of piperazine, morpholine and piperidine substituents in one of the other positions and such a heterocyclic ring substituent or an alkanol amino substituent in the third position and their acid addition salts.

SUMMARY

The present invention relates to novel substituted triazines of the formula

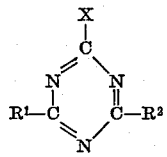

in which X represents —CCl$_3$, —CHCl$_2$ or —CH$_2$Cl, R$^1$ represents piperidino, morpholino, piperazino, N'-alkyl piperazino (alkanol=1–4 C atom alkanol), N'-phenyl piperazino, N'-substituted phenyl piperazino in which the substituted phenyl group is phenyl substituted by one or more of the following: alkyl of 1–4 C atoms, —NO$_2$ or halogen atoms, preferably, chlorine, R$^2$ represents one of the groups specified for R$^1$ or

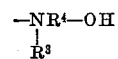

in which R$^3$ is lower alkyl with 1–6 C atoms or, preferably, hydrogen, and R$^4$ is a lower alkylene with 1–6 C atoms and their acid addition salts. Preferably, X is —CCl$_3$, R$^1$ is morpholino, piperazino or N'-lower alkyl piperazino and R$^2$ is —NHR$^4$OH. Such compounds have valuable pharmaceutical properties, especially an antiphlogistic or anti-inflammatory action and an analgesic action.

DETAILED DESCRIPTION OF THE INVENTION INCLUDING PREFERRED EMBODIMENTS

The compounds according to the invention can be produced by the following procedures:
  (a) Reacting a compound of the formula

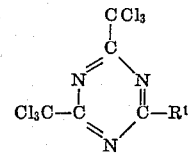

with at least a stoichiometrical amount of a compound of the formula

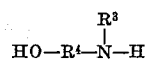

in the presence of a catalytic amount of an alkali metal alcoholate.
  (b) Reacting a compound of the formula

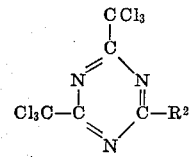

with a sufficient excess of a compound of the Formula III, piperazine, N-alkyl-piperazine, piperidine or morpholine, if desired, in the presence of small quantities of an organic solvent, preferably, in the presence of catalytic quantities of water or alkali metal hydroxide at room temperature.
  (c) Reacting a compound of the formula

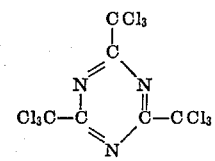

with piperazine, N-alkyl-piperazine, piperidine or morpholine under the conditions described for procedure (b).

The compounds thus prepared can, if desired, be catalytically hydrogenated to a compound of the formula

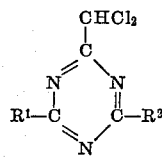

or

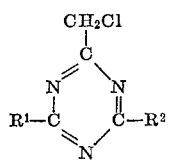

for example, in the presence of an equimolar quantity of a tertiary amine when only one of the chlorine atoms is to be replaced with hydrogen and in the presence of twice such quantity of the tertiary amine when two of the chlorine atoms are to be replaced.

With procedure (a) it is expedient to employ an excess of the amine. Preferably, about 2 mols of amine are provided per mol of triazine. The alkali metal alcoholate can be used in quantities of 0.1 to 10%. The reaction can be carried out at room temperature or moderately raised temperature without application of pressure. A lower aliphatic alcohol, such as, methanol or ethanol, can be employed advantageously as a solvent.

With procedures (b) and (c) such quantities of the amine are used that the starting triazine compound can be dissolved therein. For example, the starting triazine and the amine can be dissolved therein. For example, the starting triazine and the amine can be used in a ratio of about 1:5 to about 1:20. If the amine employed is a solid substance it can first be dissolved in a small quantity of an organic solvent, such as, for example, acetone, ethyl acetate, dioxane and the like.

The compounds according to the invention precipitate out either directly or after distilling off the excess amine as solid substances which, if desired, can be recrystallized for further purification.

The acid addition salts of such compounds can be prepared by usual methods of salt formation with pharmacologically acceptable acids, such as, for example, sulfuric, phosphoric, hydrohalic, sulfamic, benzyl sulfonic, p-toluene sulfonic, campho sulfonic, methane sulfonic, guaiazulon sulfonic, maleic, fumaric, succinic, tartaric, lactic, citric, ascorbic, glycolic and salicylic acids.

The compounds according to the invention possess valuable pharmaceutical properties and are especially valuable because of their anti-inflammatory action upon oral administration.

The compounds, for example, upon oral administration in doses of 20 to 300 mg./kg. exhibit a strong anti-inflammatory action on albumin edema of the rat paw. The compounds upon oral administration to rats act toxic in doses over 500 mg./kg. and in some instances 6500 mg./kg.

The compounds according to the invention therefore have a strong anti-inflammatory action and the indications as anti-inflammatory agents are as follows:

Chronic arthritis
Illnesses of rheumatic nature
Post-traumatic inflammations
Swellings on fractures
Thrombophlebitis in every form (including post-operative)
Bursitis
Synovitis
Collagenoses (polymyositis, periarteritis)
Gout
Intraperitoneal adhesions The novel compounds according to the invention can be used, if desired, also in combination with other medicaments, in the form of pharmaceutical compositions suited for enteral and parenteral application.

The enteral administration can, for instance, be effected in the form of tablets, capsules, pills, drageés, suppositories, oily and aqueous solutions or suspensions and emulsions. The parenteral administration can be effected in the form of injectable oily and aqueous solutions or suspensions and emulsions.

The dosage depending upon form of administration can be between 0.01 and 200 mg. one or more times a day.

In addition, the compounds upon oral administration have an analgesic action. Furthermore, they can be employed as insecticides.

The following examples will serve to illustrate the compounds according to the invention and their preparation:

EXAMPLE 1

30 g. of 2,4 - bis-trichloromethyl-6-morpholino-s-triazine were suspended in 200 ml. of methanol and 9.12 g. of ethanol amine and 0.5 g. of Na dissolved in 50 ml. of methanol added thereto. The mixture was heated under reflux until solution occurred (about 10 minutes) and such heating continued for about a further 50 minutes. The solution was cooled on ice, whereby 2-trichloromethyl - 4 - ethanolamino-6-morpholino-s-triazine crystallized out in almost analytically pure form. After it was filtered off, washed with water and dried, 22 g. of the product with a melting point of 162–164° C. were obtained. The yield was 86.3% of theory.

The starting material of this example was produced by dissolving 1 mol of tris-trichloromethyl-s-triazine in about 1 liter of methanol and adding 1 mol of morpholine to such solution at 10° C. Upon addition of the amine the solution warmed up to about 40–50° C. When the reaction solution cooled down the 2,4-bis-trichloromethyl-6-morpholino-s-triazine precipitated out and was filtered off and washed. The yield was about 75% of theory. The melting point was 160–165° C.

The corresponding 6-piperidino compound of a melting point of 106–110° C. and the corresponding 6-N'-methyl piperazino compound of a melting point of 109–112° C. used in various of the following examples were produced in an analogous manner.

EXAMPLE 2

29 g. of 2,4-bis-trichloromethyl-6-piperazino-s-triazine were dissolved in 250 ml. of methanol and 16.4 g. of 1-aminopropanol-(2) and a solution of 0.5 g. of Na in 50 ml. of methanol added thereto. The mixture was heated under reflux until solution occurred (about 30 minutes) and such heating continued for about a further 30 minutes. The solvent was then distilled off and the residue stirred up with water, whereupon crystallization occurred. After the crystals had been washed until neutral with water, and drying, 22 g. of 2 - trichloromethyl-4-(2)-propanolamino-(1)-6-piperazino-s-triazine of a melting point of 128–132° C. were obtained. The yield was 82.5% of theory.

35.5 g. of the triazine compound thus obtained were gradually introduced into a solution of 3.65 g. HCl gas in 400 ml. of methanol at room temperature while stirring whereupon solution occurred. The clear solution was concentrated and the residue washed with ether whereupon crystallization occurred. 35 g. of the hydrochloride salt with a melting point of 222° C. (decomposition) were obtained. The yield was 89.4% of theory.

EXAMPLE 3

60 g. of 2,4-bis-trichloromethyl-6-piperidino-s-triazine were suspended in 600 ml. of ethanol and 33.9 g. of 1-amino-propanol-(3) and a solution of 0.5 g. of Na in 50 ml. of methanol added thereto. The mixture was heated under reflux until solution occurred (about 30 minutes) and such heating continued for about a further 30 minutes. After processing as in Example 2, 52 g. of 2-trichloromethyl-4-(3)-propanolamino - (1) - 6 - piperidino-s-triazine of a melting point of 129–133° C. were obtained. The yield was 97.5% of theory.

EXAMPLE 4

36 g. of 2,4-bis-trichloromethyl-6-morpholino-s-triazine were suspended in 250 ml. of methanol and 20.25 g. of 1-aminopropanol-(2) and a solution of 0.5 g. of Na in 50 ml. of methanol added thereto. The mixture was heated under reflux until solution occurred (about 10 minutes) and such heating continued for about a further 50 minutes. After processing as in Example 1, 25 g. of 2-trichloromethyl - 4 - (2) - propanolamino - (1) - 6 - morpholino-s-triazine of a melting point of 145–147° C. were obtained. The yield was 78.3% of theory.

EXAMPLE 5

30 g. of 2,4-bis-trichloromethyl-6-piperidino-s-triazine were dissolved in 130 g. of morpholine. After standing for 2 days at room temperature the 2-trichloromethyl-4-piperidino-6-morpholino-s-triazine which had crystallized out was filtered off and washed with water until neutral. Impurities were removed by short heating in methanol. 26.2 g. of the product of a melting point of 157–160° C. were obtained. The yield was 90.6% of theory.

EXAMPLE 6

30 g. of tris-trichloromethyl-s-triazine were dissolved in 115 g. of morpholine to which 1 ml. of water had been added and the mixture allowed to stand for 2 days at room temperature. The 2-trichloromethyl-4,6-bis-morpholino-s-triazine which crystallized out was filtered off and washed with water until neutral. 22 g. of the product with a melting point of 233–235° C. were obtained. The yield was 79.9% of theory.

EXAMPLE 7

29 g. of 2-trichloromethyl-4-ethanol-amino-6-morpholino-s-triazine (obtained according to Example 1) were suspended in 450 ml. of methanol and 0.5 g. of Pt-oxide (80.91% Pt) and 8.38 g. of triethyl amine (molar ratio 1:1) added thereto. When hydrogen was introduced into such suspension its temperature, without external cooling, rose from 15° C. to 27° C. within about 30 minutes and remained at such temperature until the take up of hydrogen ceased after a total of 60 minutes. After the catalyst was separated off, the solution was cleared with active carbon and boiled down. The resulting crystalline 2-dichloromethyl-4-alkanol-amino-6-morpholino-s-triazine was washed out with water. 25.0 g. of the product of a melting point of 145–150° C. were obtained. The yield was 96% of theory.

EXAMPLE 8

41 g. (0.112 mol) of 2-trichloromethyl-4-ethanol-amino-6-morpholino-s-triazine (obtained according to Example 1) were suspended in 500 ml. of methanol and 0.5 g. of Pt-oxide (80.91% Pt) and 24.2 g. (above 0.2 mol) of triethyl amine (molar ratio 1:2) added thereto. When hydrogen was introduced into such suspension its temperature, without external cooling, rose from 15° C. to 33° C. After about 2 hours' introduction of hydrogen the triethyl amine had been used up and the take up of the hydrogen ceased. After the catalyst was separated off, the solution was cleared with active carbon and boiled down. The resulting crystalline 2-mono-chloromethyl-4-ethanol-amino-6-morpholino-s-triazine was washed out with water. 31.2 g. of the product of a melting point of 135–137° C. were obtained. The yield was 95% of theory.

EXAMPLE 9

300 g. (0.82 mol) of 2,4-bis-trichloromethyl-6-morpholino-s-triazine were suspended in 2 liters of methanol liquor from previous operation) and a solution of 4 g. of Na in 200 ml. of methanol and 168 g. (3×0.82 mol) of 1-aminopropane-2-ol added thereto. The mixture was heated while stirring under reflux for 2 hours. Solution occurred after about 15 minutes' heating. After cooling to 0° C., the resulting 2-trichloromethyl-4-(1-propane-2-ol)-amino-6-morpholino-s-triazine crystallized out. After filtering, washing and drying. the yield was 240 g. or 90% of theory. The melting point was 147–149° C.

EXAMPLE 10

388 g. (2 mols) of piperazine hexahydrate were dissolved in 1 liter of methanol and 433 g. (1 mol) of tris-trichloromethyl-s-triazine added thereto portionwise over a period of 45 minutes at 10° C. while stirring. After the addition was completed, the solution was warmed to dissolve the 2-piperazine-4,6-bis-trichloromethyl-s-triazine formed and filtered to remove the undissolved dimer which also had formed.

Yield: 300 g. (75% of theory), melting point 137–140° C.

400 g. of 2-piperazino-4,6-bis-trichloromethyl-s-triazine prepared as above were suspended in 2.5 liters of methanol and 244 g. (4 mols) of ethanolamine added thereto and the solution refluxed for 12 hours. After filtering the solution was boiled down and the viscous residue stirred up with water whereupon the 2-trichloromethyl-4-ethanol-amino-6-piperazino-s-triazine crystallized out.

Yield: 275 g. (80% of theory), melting point 139–142° C.

34.15 g. of the triazine compound thus obtained were added portionwise while stirring to a solution of 3.65 g. of HCl gas in 300 ml. of methanol at room temperature whereupon solution occurred with warming. After 2 hours' standing the HCl salt of the triazine compound began to separate out and after the crystallization had ended the crystals were filtered off and dried. 31.6 g. of the HCl salt with a melting point of 109–112° C. were obtained. The yield was 83.6% of theory.

EXAMPLE 11

414 g. (1 mol) of 2,4-bis-trichloromethyl-6-N'-methyl-piperazino-s-triazine were suspended in 2.5 liters of methanol and 183 g. (3 mols) of ethanolamine and a solution of 0.4 g. of Na in 10 ml. of methanol added thereto. The mixture was heated under reflux for 3 hours. After filtering, the resulting solution was boiled down and the residue stirred up with water whereupon the 2-trichloromethyl-4-ethanolamino-6-N'-methyl-piperazino-s-triazine crystallized out.

Yield: 250 g. (70% of theory), melting point 136–140° C.

The HCl salt was prepared from such triazine compound in the same manner as in Example 10. Its melting point was 212° C. (decomposition).

EXAMPLE 12

38.9 g. of 2-N-methylethanolamino-4,6-bis-trichloromethyl-s-triazine were dissolved in 87.12 g. morpholine. The solution was allowed to stand at room temperature for 2 days and was then heated for 2 hours at 60° C. The excess morpholine was then distilled off and the residue dissolved in methylene chloride and washed with diluted hydrochloric acid. The methylene chloride solution was boiled down whereby the viscous 2-trichloromethyl-4-morpholino - 6 - N - methyl-ethanol-amino-s-triazine was obtained. Yield: 32 g. (89% of theory).

EXAMPLE 13

41.4 g. (0.1 mol) of 2,6-bis-trichloromethyl-4-N'-methyl-piperazino-s-triazine were heated with 22.5 g. (0.3 mol) of isopropanol amine in a solution of 0.4 g. of Na in 300 ml. of methanol under reflux for 3 hours whereupon solution occurred.

The solution was concentrated and the residue washed several times with water. 31 g. of 2-trichloro-methyl-4-N'-methyl - piperazino-6-(2-hydroxy - propyl)-amino-s-triazine with a melting point of 151–153° C. were obtained. The yield was 83.4% of theory.

EXAMPLE 14

47.6 g. (0.1 mol) of 2,6-bis-trichloromethyl-4-N'-phenyl-piperazino-s-triazine were suspended in 250 ml. of methanol and heated for 6 hours under reflux with 18.3 g. (0.3 mol) of ethanol amine. Solution occurred after 1 hour. One-half of the methanol was then distilled off and the residue allowed to stand overnight for crystallization. After filtering and washing with water, 35.5 g. of 2-trichloromethyl - 4 - phenyl-piperazino-6-ethanolamino-s-triazine of a melting point of 138–141° C. (85.1% of theory) were obtained.

EXAMPLE 15

47.6 g. (0.1 mol) of 2,6-bis-trichloromethyl-4-N'-phenyl-piperazino-s-triazine were suspended in 250 ml. of methanol and heated for 6 hours under reflux with 22.5 g. (0.3 mol) of isopropanol amine. Solution occurred after 1 hour. One-half of the methanol was then distilled off and the residue allowed to stand overnight for crystallization. After filtering and washing with water, 31 g. of 2-trichloromethyl - 4 - phenyl-piperazino-6-isopropanolamino-s-triazine of a melting point of 160–170° C. (decomposition) (71.8% of theory) were obtained.

EXAMPLE 16

49.0 g. (0.1 mol) of 2,6-bis-trichloromethyl-4-N'-p-methylphenyl-piperazino-s-triazine were suspended in 250 ml. of methanol and heated under reflux for 6 hours with 18.3 g. (0.3 mol) of ethanol amine. Solution occurred after 45 minutes. Upon cooling 2-trichloromethyl-4-N'-p-methylphenylpiperazino - 6 - ethanolamino - s - triazine crystallized out. After filtering and washing with alcohol and water and drying, 40 g. (92.5% of theory) of such crystals with a melting point of 165–167° C. were obtained.

EXAMPLE 17

49.0 g. (0.1 mol) of 2,6-bis-trichloromethyl-4-N'-p-methylphenyl-piperazino-s-triazine were suspended in 250 ml. of methanol and heated under reflux for 6 hours with 22.5 g. (0.3 mol) of isopropanol amine. Solution occurred after 45 minutes. Upon cooling 2-trichloromethyl-4-N'-p-methylphenylpiperazino-6-isopropanolamino - s - triazine crystallized out. After filtering and washing with alcohol and water and drying, 37.9 g. (85% of theory) of such crystals with a melting point of 155–158° C. were obtained.

EXAMPLE 18

(a) 51.05 g. (0.1 mol) of 2,6-bis-trichloromethyl-4-N'-p-chlorophenyl-piperazino-s-triazine were suspended in 250 ml. of methanol and heated under reflux for 6 hours with 18.3 g. (0.3 mol) of ethanol amine. Solution occurred after 3 hours. After processing as in Example 16, 30.8 g. (82.8% of theory) of 2-trichloromethyl-4-N'-p-chlorophenyl-piperazino-6-ethanolamino-s-triazine of a melting point of 150–155° C. were obtained.

(b) The procedure under (a) was repeated using 22.5 g. of isopropanol amine in place of the 18.3 g. of ethanol amine. 30 g. (78.2% of theory) of 2-trichloromethyl-4-N'-p-chlorophenylpiperazino - 6 - isopropanolamino-s-triazine of a melting point of 147–151° C. were obtained.

EXAMPLE 19

(a) 86.7 g. (0.2 mol) of 2,4,6-tris-trichloromethyl-s-triazine were suspended in 200 ml. of methanol and 26.0 g. (0.2 mol) of N-2-hydroxy-ethylpiperazine added thereto at room temperature. Solution occurred after the mixture had been heated to 40° C. After standing overnight the solution was concentrated and the residue taken up in 200 ml. of methylene chloride, washed several times with water and then concentrated. The syrupy residue according to a layer chromatogram was about 95% pure and elemental analysis gave the values for 2,6-bis-trichloromethyl-4-N'-(2-hydroxyethyl) - piperazino - s - triazine. The yield was 81.5 g. or 91.8% of theory.

(b) 45 g. (about 0.1 mol) of the triazine compound obtained under (a) were dissolved in 150 ml. of alcohol and heated for 8 hours under reflux with 18.3 g. (0.3 mol) of ethanol amine. The solution was concentrated under vacuum whereupon the triazine compound crystallized out. The residue was washed several times with water and then dried. 30 g. (77.8% of theory) of 2-trichloromethyl-4-N'-(2-hydroxyethyl) - piperazino - 6 - ethanolamino-s-triazine of a melting point of 127–130° C. were obtained.

EXAMPLE 20

34.15 g. (0.1 mol) of 2-trichloromethyl-4-piperazino-6-ethanolamino-s-triazine (produced according to Example 10) were suspended in 100 ml. of methanol and then a solution of 11.6 g. (0.1 mol) of maleic acid in 150 ml. of methanol was added to such suspension whereupon complete solution resulted. After standing overnight the maleic acid addition salt of the triazine compound crystallized out. Again it was filtered off and washed with some methanol. The yield was 39 g. or 85.2% of theory. The melting point of the salt was 191° C. (decomposition).

EXAMPLE 21

40 g. (0.1 mol) of 2,6-bis-trichloromethyl-4-piperazino-s-triazine were dissolved in 156.7 g. (1.8 mol) of cold morpholine. After standing for 3 days the resulting crystal slurry was filtered off on a suction filter and washed neutral with water. After recrystallization from 30 ml. of acetone, 24 g. of 2-trichloromethyl-4-piperazino-6-morpholine-s-triazine of a melting point of 179° C. (decomposition) were obtained. The yield was 65.3% of theory.

EXAMPLE 22

17.0 g. (0.05 mol) of 2-trichloromethyl-4-piperazino-6-ethanolamino-s-triazine were dissolved in 60 ml. of warm methanol and then a solution of 7.5 g. (0.05 mol) of d-tartaric acid in 25 ml. of methanol added therto, whereupon the salt of the triazine compound crystallized out immediately. After standing for one day the crystal slurry was filtered off on a suction filter and washed with a little methanol. 19.7 g. of the tartrate salt with a melting point of 195–200° C. were obtained. The yield was 80% of theory.

EXAMPLE 23

17.0 g. (0.05 mol) of 2-trichloromethyl-4-piperazino-6-ethanolamino-s-triazine were dissolved in 60 ml. of warm methanol and then a solution of 7 g. (0.033 mol) of critic acid·$1H_2O$ in 30 ml. of methanol added thereto. After some time the salt of the triazine compound began to crystallize out. After standing overnight the crystal slurry was filtered off on a suction filter and washed with a little methanol. 20 g. of the citrate salt of a melting point of 187–190° C. (decomposition) were obtained. The yield was 85% of theory.

EXAMPLE 24

19.3 g. (0.05 mol) of 2-trichloromethyl-4-N'-(2-hydroxyethyl)-piperazino-6 - ethanolamino-s-triazine (produced according to Example 19) were dissolved in 100 ml. of warm methanol and 5.8 g. (0.05 mol) of maleic acid added thereto whereupon solution resulted. After cooling and the addition of 100 ml. of ether crystallization occurred. After standing for 2 hours the crystals were filtered off and washed with ether. 21.5 g. of the maleic acid addition salt of a melting point of 141–145° C. were obtained. The yield was 85.6% of theory.

EXAMPLE 25

21.6 g. (0.05 mol) of 2-trichloromethyl-4-N'-(4-methylphenyl)-piperazino-6-ethanolamino-s-triazine were suspended in 80 ml. of methanol. Solution occured after introduction of 1.8 g. HCl gas. After a short time the salt of the triazine compound began to crystallize. Crystallization was completed by addition of 100 ml. ether. The crystal slurry was then filtered off on a suction filter and washed with ether. 20 g. of 2-trichloromethyl-4-N'-(4-methylphenyl)-piperazino-6 - ethanolamino-s-triazine

I claim:

1. A pharmaceutically acceptable acid addition salt of a compound of the formula

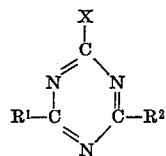

in which X is selected from the group consisting of —CCl₃, —CHCl₂ and CH₂Cl, R¹ is selected from the group consisting of piperidino, morpholino, piperazino, N'-alkyl-piperazino in which the alkyl is of 1–4 carbon atoms, N'-alkanol-piperazino in which the alkanol is of 1–4 carbon atoms, N'-phenyl-piperazino and N'-substituted phenyl-piperazino in which the substituted phenyl is phenyl substituted by at least one member of the group consisting of alkyl of 1 to 6 carbon atoms, —NO₂ and halogen atoms, and R² is a member selected from the group consisting if the members as defined for R¹ other than morpholino, and

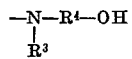

in which R⁴ is alkyene of 1 to 6 carbon atoms and R³ is selected from the group consisting of hydrogen and alkyl of 1 to 6 carbon atoms.

2. The salt of claim 1 which is a hydrochloric acid, maleic acid, tartaric acid or citric acid addition salt.

3. The salt of claim 1 wherein R² is

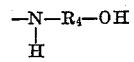

4. The salt of claim 3 wherein R¹ is morpholino.
5. The salt of claim 1 in which R¹ is morpholino and R² is ethanolamino.
6. The salt of claim 4 in which X is —CCl₃.
7. The salt of claim 1 in which X is —CCl₃, R¹ is piperazino and R² is ethanolamino.
8. The salt of claim 1 in which X is —CCl₃, R¹ is piperazino and R² is ethanolamino in the form of its HCl salt.
9. The salt of claim 1 in which X is —CCl₃, R¹ is piperazino and R² is 2-hydroxy propylamino.
10. The salt of claim 1 in which X is —CCl₃, R¹ is N'-methyl-piperazino and R² is ethanolamino.
11. The salt of claim 1 in which X is —CCl₃, R¹ is N'-methyl-piperazino and R² is 2-hydroxy propylamino.

References Cited
UNITED STATES PATENTS

| | | | |
|---|---|---|---|
| 3,086,855 | 4/1963 | Knusli et al. | 260—249.9 XR |
| 3,103,512 | 9/1963 | Weiberg | 260—249.9 |
| 3,310,557 | 3/1967 | Kleemann | 260—249.6 |

JOHN D. RANDOLPH, Primary Examiner

J. M. FORD, Assistant Examiner

U.S. Cl. X.R.

260—247.5, 249.9, 999